United States Patent Office 3,600,406
Patented Aug. 17, 1971

3,600,406
TETRACARBOXYLIC CYCLOALKYL KETONES
Irving Touval, Fords, N.J., assignor to Universal Oil
Products Company, Des Plaines, Ill.
No Drawing. Continuation-in-part of application Ser. No.
572,915, Aug. 17, 1966. This application Feb. 14, 1969,
Ser. No. 799,494
Int. Cl. C07c 61/06, 61/08, 61/10
U.S. Cl. 260—346.3                              8 Claims

ABSTRACT OF THE DISCLOSURE

Bis(cycloalkyldicarboxylic acid)ketones, the corresponding anhydrides and lower alkyl esters thereof are exemplified by bis(4 - cyclohexyl - 1,2-dicarboxylic acid) ketone. The compounds may be prepared by reacting a cycloalkene dicarboxylic compound with carbon monoxide in the presence of a metal carbonyl and water under hydroxylation conditions, said compounds being useful as reactive components of polyesters, epoxy curing agents, etc.

---

This application is a continuation-in-part of my copending application, Ser. No. 572,915, filed Aug. 17, 1966, now abandoned.

This invention relates to novel compositions of matter comprising polycarboxylic compounds, and to a method for the preparation thereof. More particularly, the invention is directed to a novel class of tetracarboxylic cycloalkyl ketones and to a method for the preparation thereof.

The novel compositions of matter of the present invention which, as hereinbefore set forth, comprise tetracarboxylic cycloalkyl ketones, will find a wide variety of uses in the chemical field. The compounds are especially useful as reactive components of valuable polymeric compounds such as polyesters, polyamic-acids, polyimides or epoxy curing agents, etc.

It is therefore an object of this invention to provide a novel class of polycarboxylic compounds possessing valuable utility.

Another object of this inention is to provide a novel class of tetracarboxylic cycloalkyl ketones and to a method for the preparation thereof.

In one aspect an embodiment of this invention resides in a polycarboxylic ketone having the formulae:

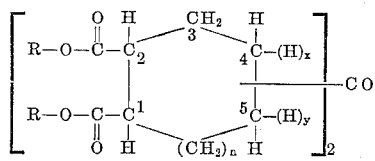

or

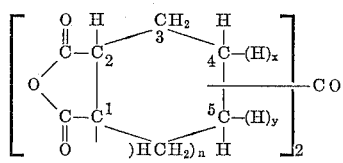

where R is selected from the group consisting of hydrogen and alkyl containing from 1 to about 5 carbon atoms, the carbonyl group being attached to the carbon atom in the 4 of 5 ring position; $n$ is an integer of from 0 to 3; $x$ is 0 and $y$ is 1 when the carbonyl group is attached to the carbon atom in the 4 position, and $x$ is 1 and $y$ is 0 when the carbonyl group is attached to the carbon atom in the 5 position.

Another embodiment of this invention is found in a method of preparing a polycarboxylic ketone which comprises reacting a dicarboxylic cycloalkene having the formulae:

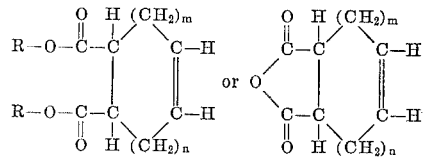

in which R is selected from the group consisting of hydrogen and alkyl containing from 1 to about 5 carbon atoms; $n$ is an integer of from 0 to 3; and $m$ is 1 or 2, with carbon monoxide in the presence of a catalyst and water at hydrocarboxylation conditions, and recovering the resultant ketone.

A specific embodiment of this invention comprises bis-(4-cyclohexyl-1,2-dicarboxylic acid) ketone.

Other objects and embodiments will be found in the following further detailed description of the present invention.

As hereinbefore set forth, the present invention is concerned with novel compositions of matter comprising tetracarboxylic cycloalkyl ketones and to a method for the preparation thereof. The tetracarboxylic cycloalkyl ketones which constitute the novel compositions of matter of the present invention may be prepared, in general, according to the method of this invention, by hydrocarboxylating a cycloalkene dicarboxylic compound having the formulae:

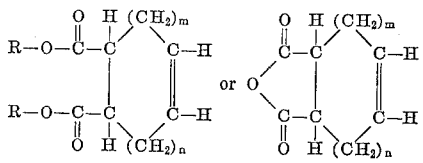

wherein R is selected from the group consisting of hydrogen and alkyl containing from 1 to about 5 carbon atoms; $n$ is an integer of from 0 to 3 and $m$ is 1 or 2, with carbon monoxide in the presence of a catalyst and water. When preparing the tetracarboxylic acid cycloalkyl ketone the cycloalkene dicarboxylic acid compound reactant which is used in the hydroxylation reaction may comprise either a cycloalkene dicarboxylic acid or the anhydride thereof. When preparing the tetraester compound, the cycloalkene dicarboxylic acid compound reactant used in the hydrocarboxylation reaction comprises a dialkyl ester of a cycloalkene dicarboxylic acid in which the alkyl portion of the ester preferably contains from 1 to about 5 carbon atoms per alkyl group. Alternatively, the cycloalkene dicarboxylic acid compound reactant which is used in the tetraester formation may comprise either a cycloalkene dicarboxylic acid or the anhydride thereof when the hydrocarboxylation reaction is effected in the presence of an alcohol reactant, for example, an alkanol containing from 1 to about 5 carbon atoms per molecule. As an alternative procedure for preparing the tetraacid, the corresponding tetraester may be first prepared and then converted to the tetraacid by saponification. Examples of the cycloalkene dicarboxylic compound which may be used in the hydrocarboxylation possess the formulae:

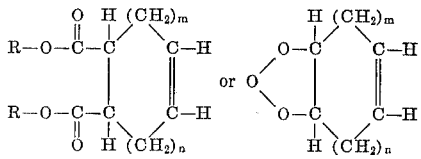

where R is selected from the group consisting of hydrogen and alkyl containing from 1 to about 5 carbon atoms, $n$ is an integer of from 0 to 3, and $m$ is 1 or 2. The reactants include, where it is a cycloalkene dicarboxylic acid or anhydride, such compounds as 4-cyclopentene-1,2-dicarboxylic acid,
4-cyclohexene-1,2-dicarboxylic acid,
5-cyclohexene-1,2-dicarboxylic acid,
4-cycloheptene-1,2-dicarboxylic acid,
5-cycloheptene-1,2-dicarboxylic acid,
5-cyclooctene-1,2-dicarboxylic acid, etc.;
4-cyclopentene-1,2-dicarboxylic anhydride,
5-cyclohexene-1,2-dicarboxylic anhydride,
4-cycloheptene-1,2-dicarboxylic anhydride,
5-cycloheptene-1,2-dicarboxylic anhydride,
4-cyclooctene-1,2-dicarboxylic anhydride,
5-cyclooctene-1,2-dicarboxylic anhydride, etc.; or where it is a dialkyl ester of a cycloalkene dicarboxylic acid, such compounds as 4-cyclopentene-1,2-dimethyl dicarboxylate,
4-cyclopentene-1,2-diethyl carboxylate,
4-cyclohexene-1,2-dimethyl carboxylate,
4-cyclohexene-1,2-diethyl dicarboxylate,
5-cyclohexene-1,2-dimethyl dicarboxylate,
5-cyclohexene-1,2-diethyl carboxylate,
4-cycloheptene-1,2-dipropyl dicarboxylate,
5-cycloheptene-1,2-dipropyl dicarboxylate,
4-cyclooctene-1,2-dimethyl dicarboxylate, etc. The cycloalkene dicarboxylic compounds recited above are, of course, illustrative of only a few of the many compounds which may be used and that the present invention is not necessarily limited thereto. It should also be understood that the cycloalkene dicarboxylic compounds may be substituted with a variety of common substituents such as alkyl, alkoxy or halo, examples of which include 4-cyclohexene-6-methyl-1,2-dicarboxylic acid or 4-cyclohexene-6-chloro-1,2-dicarboxylic acid.

The hydrocarboxylation with carbon monoxide to prepare the tetraester, tetraacid, or anhydride thereof, may be conducted either in the presence of free carbon monoxide or in the presence of a material supplying the carbon monoxide reactant in situ. The latter procedure is the preferred method of this invention and is effected by conducting the reaction in the presence of a material such as a metal carbonyl, for example, nickel or cobalt carbonyl, which generates the carbon monoxide reactant in situ. This method is particularly advantageous in that the high carbon monoxide pressure required when using free carbon monoxide is avoided. The quantity of the metal carbonyl used in the reaction is not critical and may be widely varied. Generally, however, it is advantageous to use an excess above the stoichiometric level of one-half mole of carbonyl per four moles of the cycloalkene dicarboxylic compound reactant and preferably within the range of 1 mole of the carbonyl per 2 to 8 moles of the cycloalkene dicarboxylic compound. The catalyst used in the hydrocarboxylation reaction may be any of the well-known catalysts used in carboxylation reactions including, for example, metallic nickel or cobalt, particularly in combination with acids such as acetic acid. A particularly advantageous catalyst system for the hydrocarboxylation reaction of this invention when using a metal carbonyl such as nickel carbonyl is to have acetic acid present in the system to act in catalytic association with the metallic portion of the carbonyl. The quantity of catalyst used may be widely varied and when the catalyst comprises the metal carbonyl in association with an acid such as acetic acid, a quantity of such acid approximately equal in weight to the weight of the metal carbonyl is usually satisfactory under most circumstances.

The conditions used in effecting the hydrocarboxylation may be varied but, due to the highly exothermic nature of the reaction, it is preferred to conduct the reaction at a low temperature within the range of from 0° to 75° C. and, more preferably, from about 40° to 60° C. and particularly at the refluxing temperature of the reaction mixture at atmospheric pressure. Higher temperatures and pressures may, however, be used with proper control especially for the less reactive cycloalkene dicarboxylic compounds, for example, temperatures ranging up to about 300° C. and pressures ranging up to 15 atmospheres or more. The duration of the reaction is not important and is dependent upon such variable factors as the temperature and the degree of mixing, but usually a period ranging from about ½ to 10 hours is satisfactory for most reactions. The quantity of water used is not critical but it should, at least, range from about 1.1 to 2 moles of water per mole of the cycloalkene dicarboxylic reactant. A solvent is advantageously used in the hydrocarboxylation, and solvents suitable for such purpose include such materials as the dimethyl ether of ethylene glycol, the dimethyl ether of diethylene glycol, tetrahydrofuran, dioxane or alcohols such as ethyl alcohol. When preparing the tetraacid, the solvent should preferably be nonalcoholic so as to prevent the formation of ester by-products. Alcohols may be used, however, without substantial ester formation if the quantity of water present is in substantial excess above the alcohol.

In the less preferred method of hydrocarboxylation where free carbon monoxide is used, the reaction is effected at superatmospheric carbon monoxide pressure generally ranging from about 2500 to 6000 pounds per square inch, and elevated temperatures generally ranging from about 250° to 350° C. The carbon monoxide is preferably used in slight excess with a ratio of about 0.5 to 2 moles of carbon monoxide per mole of the cycloalkene dicarboxylic compound reactant being suitable under most circumstances. The catalyst used in this method may be either nickel, cobalt, or the corresponding carbonyls. The quantity of catalyst used may be widely varied but usually a quantity ranging from about 0.05 to about 30 weight percent of the reaction mixture is sufficient. The reactants described above for the preferred hydrocarboxylation method effected in the presence of a metal carbonyl may similarly be used in this method. The ketones comprising novel compositions of matter of the present invention possess the formulae:

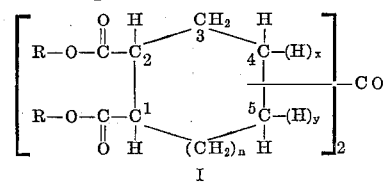

or

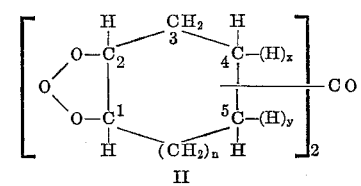

in which R is selected from the group consisting of hydrogen and alkyl of from 1 to about 5 carbon atoms, the carbonyl group being attached to the carbon atom in the 4 or 5 ring position, $n$ is an integer of from 0 to 3, $x$ is 0 and $y$ is 1 when the carbonyl group is in the 4 position and $x$ is 1 and $y$ is 0 when the carbonyl group is in the 5 position. Examples of the tetraacid or tetraester ketones of this invention represented by Formula I above include but are not limited to bis(4-cyclopentyl-1,2-dicarboxylic acid)ketone, bis(4-cyclohexyl-1,2-dicarboxylic acid)ketone, bis(4 - cycloheptyl-1,2-dicarboxylic acid)ketone, bis(5-cycloheptyl - 1,2 - dicarboxylic acid) ketone or bis(4-cyclooctyl - 1,2-dicarboxylic acid)ketone, or bis(4 - cyclopentyl - 1,2 - dimethyl dicarboxylate)

ketone, bis(4-cyclohexyl - 1,2 - dimethyl dicarboxylate) ketone, bis(4 - cycloheptyl - 1,2 - diethyl dicarboxylate) ketone, bis(5 - cycloheptyl - 1,2 - diethyl dicarboxylate) ketone, bis(4 - cyclooctyl-1,2-dimethyl dicarboxylate)ketone, etc.

The dianhydride ketone represented by Formula II above, as indicated, may be prepared by dehydrating a corresponding tetraacid or tetraester represented by Formula I above. The dehydration may be effected according to any of the well-known dehydration procedures such as thermal dehydration or treatment with phosphorus oxy-chloride, thionyl chloride, phosphorus pentoxide or acetic anhydride. Preferably, the dianhydride ketone is prepared using the tetraacid as the reactant and advantageously such preparation is effected using acetic anhydride. For example, the tetraacid can be reacted with an excess of acetic anhydride at the refluxing temperature of the mixture for a period sufficient to complete the reaction. After removing the excess acetic anhydride and acetic acid formed during the reaction from the reaction mixture, the mixture may be admixed with water and the desired dianhydride ketone thereafter recovered. Examples of the dianhydride ketones of this invention represented by Formula II include but are not limited to bis(4 - cyclopentyl - 1,2 - dicarboxylic anhydride)ketone, bis(4 - cyclohexyl - 1,2 - dicarboxylic anhydride)ketone, bis(4 - cycloheptyl - 1,2 - dicarboxylic anhydride)ketone, bis(5 - cycloheptyl - 1,2 - dicarboxylic anhydride)ketone, or bis(4-cyclooctyl - 1,2-dicarboxylic anhydride) ketone, etc.

The preparation of the compounds represented by Formulae I and II above may be achieved in a batch, semi-continuous or continuous type process. For example, in a batch type process using a material to supply the carbon monoxide reaction in situ, an appropriate quantity of a metal carbonyl, for example, nickel carbonyl, an acid such as acetic acid, water and a solvent are charged together with the desired cycloalkene dicarboxylic compound reactant under an inert atmosphere such as nitrogen to a reaction vessel equipped with mixing, heating and cooling means. Extreme caution should be used in conducting the reaction because of the highly poisonous nature of the metal carbonyl. Due to the exothermic nature of the reaction, the temperature should be gradually raised with mixing to the desired range which, under atmospheric pressure, usually ranges from about 40° to 60° C. The temperature of the mixture is then maintained for a period sufficient to complete the reaction. The desired ketone products are then isolated and purified according to conventional techniques including, for example, extraction, distillation and crystallization. When the dianhydride ketone product represented by Formula II above is desired, preferably a tetraacid prepared as above, is charged to a vessel containing excess acetic anhydride. The mixture is then stirred and heated to refluxing temperature and maintained thereat until the reaction is complete. After removing acetic anhydride and acetic acid from the reaction mixture by distillation, the remaining mixture is mixed with water at a low temperature. The resulting dianhydride ketone product is then isolated and purified by conventional techniques including distillation, filtration and crystallization.

The following examples are cited to illustrate the novel class of compounds of this invention and the method of preparation therefor, but they are not intended to limit the broad nature of the invention to the specific products and procedures recited therein.

EXAMPLE I

To a reaction flask equipped with heating, cooling and mixing means and means for maintaining an atmosphere of nitrogen therein are charged 226 grams (1.0 mole) of 4-cyclohexene-1,2-diethyl carboxylate, 20 grams of water, 30 grams of acetic acid, 450 grams of tetrahydrofuran and 51.2 grams (0.3 mole) of nickel carbonyl. With mixing the solution is heated to about 45° C. and after a short period the reaction becomes exothermic. The temperature of the mixture is then maintained at about 45° C. for about 6 hours. The mixture is then cooled to about 25° C. and an aqueous sulfuric acid solution is added and the resulting mixture extracted with toluene. The toluene extract is washed with a sodium chloride solution and then distilled to remove the solvent. The residue is redissolved by refluxing with an aqueous sodium hydroxide solution (90 grams in 900 milliliters of water), thereby forming the salt of the tetraacid. Toluene is added and the mixture is then allowed to separate into aqueous and organic layers. The aqueous layer is separated and acidified with hydrochloric acid at about 0° C. The resulting bis(4-cyclohexyl-1,2-dicarboxylic acid)ketone is then recovered from the mixture.

EXAMPLE II

To a reaction flask equipped with heating, cooling and mixing means and means for maintaining an atmosphere of nitrogen therein are charged 226 grams (1.0 mole) of 4-cyclohexene-1,2-diethyl carboxylate, 30 grams, of acetic acid, 20 grams of water, 375 grams of ethanol and 51.2 grams (0.3 mole) of nickel carbonyl. With mixing the solution is heated to about 45° C. and after a short period the reaction becomes exothermic. The temperature of the mixture is then maintained at about 45° C. for about 6 hours. The mixture is then cooled to about 25° C. and an aqueous sulfuric acid solution is added and the resulting mixture is then extracted with toluene. The toluene extract is washed with a sodium chloride solution and then distilled to remove all water. The residue is redissolved in toluene and the mixture washed first with a saturated sodium bicarbonate solution. The washed mixture is then dried by contacting with sodium sulfate and after removal of the sulfate by filtration, the toluene is removed by distillation. By vacuum distillation, the by-product, the triethyl ester of cyclohexyl - 2,3,5 - tricarboxylic acid, is removed as a volatile liquid. The desired bis(4-cyclohexyl-1,2-diethyl carboxylate)ketone is then recovered from the residue.

EXAMPLE III

To a reaction flask equipped with heating, cooling and mixing means containing 204 grams (2.0 moles) of acetic anhydride are charged 92.0 grams (0.25 mole) of bis(4-cyclohexyl-1,2-dicarboxylic acid)ketone. The mixture is heated to reflux temperature and maintained thereat for a period of four hours. After the excess acetic anhydride and acetic acid formed during the reaction are removed from the reaction mixture by distillation, the remaining mixture is slowly charged to a mixture of ice and water and the resulting mixture is stirred for a few minutes. The resulting product crystals are then separated and washed with water to recover the desired bis(4-cyclohexyl-1,2-dicarboxylic anhydride)ketone product.

EXAMPLE IV

In this example 1 mole of 4-cyclopentene-1,2-dimethyl carboxylate is charged to a reaction flask provided with heating, cooling, and mixing means along with 20 grams of water, 30 grams of acetic acid, 450 grams of tetrahydrofuran and 51 grams of nickel carbonyl. The solution is thoroughly admixed while heating to a temperature of about 45° C. After maintaining the temperature at this level for a period of 6 hours, the mixture is then cooled to room temperature and an aqueous sulfuric acid solution is added thereto. The resulting mixture is extracted with toluene, the toluene extract is washed with a sodium chloride solution and thereafter subjected to fractional distillation to remove the solvent. The residue is then treated in a manner similar to that set forth in Example I above and the desired product comprising bis(4 - cyclopentyl-1,2-dicarboxylic acid)ketone is recovered.

EXAMPLE V

In this example, 1 mole of 4-cyclopentene-1,2-diethyl dicarboxylate is reacted with acetic acid, water and ethanol in the presence of nickel carbonyl at a temperature of about 45° C. for a period of 6 hours, the solution being thoroughly admixed during the reaction period. Upon completion of the aforementioned residence time, the mixture is cooled to room temperature, acidified with an aqueous sulfuric acid solution and the resulting mixture extracted with toluene. The extract is neutralized with a sodium chloride solution and thereafter subjected to fractional distillation to remove the solvent and water. The residue is then treated in a manner similar to that set forth in the above examples and the desired product comprising bis(4-cyclopentyl-1,2-diethyl dicarboxylate)ketone is recovered.

EXAMPLE VI

A solution of bis(4-cyclohexyl-1,2-dicarboxylic acid)-ketone and acetic anhydride is heated to reflux and maintained thereat for a period of 4 hours. The acetic acid formed during the reaction and the excess acetic anhydride are removed by fractional distillation, and the remainder of the mixture is slowly charged to a mixture of ice and water. The resulting mixture is stirred for a few minutes and the resulting product crystals comprising bis(4-cyclopentyl-1,2-dicarboxylic anhydride)ketone are recovered therefrom.

I claim as my invention:

1. A polycarboxylic ketone having the formulae:

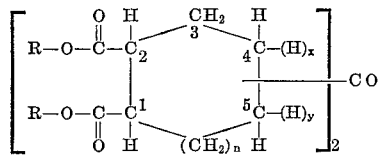

or

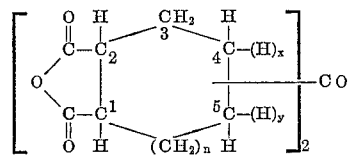

where R is selected from the group consisting of hydrogen and alkyl containing from 1 to 5 carbon atoms, the carbonyl group being attached to the carbon atom in the 4 or 5 ring position; $n$ is an integer of from 0 to 3; $x$ is 0 and $y$ is 1 when the carbonyl group is attached to the carbon atom in the 4 position, and $x$ is 1 and $y$ is 0 when the carbonyl group is attached to the carbon atom in the 5 position.

2. The polycarboxylic ketone according to claim 1 in which $n$ is 0.

3. The polycarboxylic ketone according to claim 1 in which $n$ is 1.

4. The polycarboxylic ketone of claim 1 being bis(4-cyclohexyl-1,2-dicarboxylic acid)ketone.

5. The polycarboxylic ketone of claim 1 being bis(4-cyclohexyl-1,2-diethyl carboxylate)ketone.

6. The polycarboxylic ketone of claim 1 being bis(4-cyclohexyl-1,2-dicarboxylic anhydride)ketone.

7. The polycarboxylic ketone of claim 1 being bis(4-cyclopentyl-1,2-dicarboxylic acid)ketone.

8. The polycarboxylic ketone of claim 1 being bis(4-cyclopentyl-1,2-diethyl carboxylate)ketone.

References Cited

UNITED STATES PATENTS 3,326,940   6/1967   Dunkel _____ 260—346.3

OTHER REFERENCES

Bird et al.: Journal of Chemical Society (1963), pp. 410–420.

ALEX MAZEL, Primary Examiner

B. I. DENTZ, Assistant Examiner

U.S. Cl. X.R.

260—2, 75, 78, 468, 514